(12) United States Patent
Miller et al.

(10) Patent No.: US 6,495,032 B2
(45) Date of Patent: Dec. 17, 2002

(54) FILTER ARRANGEMENT

(75) Inventors: Gary Wayne Miller, Livonia, MI (US); Thomas Dean Barker, Novi, MI (US); Garth James Schultz, Oxford, MI (US); Stephen Alan Carter, Mississauga (CA)

(73) Assignee: Dynetek Industries Ltd., Calgary (CA)

(*) Notice: Subject to any disclaimer, the term of this patent is extended or adjusted under 35 U.S.C. 154(b) by 12 days.

(21) Appl. No.: 09/783,180

(22) Filed: Feb. 14, 2001

(65) Prior Publication Data

US 2001/0008147 A1 Jul. 19, 2001

Related U.S. Application Data

(63) Continuation-in-part of application No. 09/642,747, filed on Aug. 18, 2000, now Pat. No. 6,321,779, which is a continuation-in-part of application No. 09/314,756, filed on May 19, 1999, now Pat. No. 6,186,168.

(51) Int. Cl.$^7$ ................................................ B01D 35/14
(52) U.S. Cl. ..................... 210/130; 123/510; 137/544; 137/549; 210/97; 210/171; 210/418; 210/433.1
(58) Field of Search ............................... 210/416.4, 418, 210/420, 424, 433.1, 446, 97, 130, 171, 434, 435; 137/115.13, 505.1, 505.25, 544, 549; 123/510, 511, 514

(56) References Cited

U.S. PATENT DOCUMENTS

| | | |
|---|---|---|
| 664,383 A | 12/1900 | Claude et al. |
| 903,134 A | 11/1908 | Giron |
| 1,734,514 A | 11/1929 | Benson et al. |
| 1,799,914 A | 4/1931 | Lemoine |
| 2,294,432 A | 9/1942 | Weidner |
| 2,731,033 A | 1/1956 | Cable |
| 2,793,504 A | 5/1957 | Webster |
| 2,987,570 A | 6/1961 | Bluth |
| 3,059,210 A | 10/1962 | Luenberger |
| 3,084,210 A | 4/1963 | Bluth et al. |
| 3,094,141 A | 6/1963 | Maienknecht |
| 3,109,882 A | 11/1963 | Maltby |
| 3,118,295 A | 1/1964 | Van Poppel |
| 3,164,308 A | 1/1965 | Marcovitch et al. |
| 3,211,175 A | 10/1965 | Replogle |
| 3,352,963 A | 11/1967 | Homrig |
| 3,386,072 A | 5/1968 | Chandler |
| 3,520,989 A | 7/1970 | Funk et al. |
| 3,565,201 A | 2/1971 | Petsinger |
| 3,789,820 A | 2/1974 | Douglas et al. |
| 4,020,863 A | 5/1977 | Fabish |
| 4,173,986 A | 11/1979 | Martin |
| 4,458,108 A | 7/1984 | Kashimoto et al. |
| 4,481,969 A | 11/1984 | Fallon et al. |
| 4,489,700 A | 12/1984 | van der Weide |
| 4,520,838 A | 6/1985 | Fisher et al. |
| 4,561,465 A | 12/1985 | Rogers |
| 4,572,477 A | 2/1986 | Phlipot et al. |

(List continued on next page.)

Primary Examiner—Joseph W. Drodge
(74) Attorney, Agent, or Firm—Sean W. Goodwin

(57) ABSTRACT

A filter arrangement for use with a vessel that receives fluid includes a body engageable with the vessel. The body has an inlet port, an outlet port, a body cavity, a first fluid path disposed between the inlet port and body cavity, and a second fluid path disposed between the body cavity and the outlet port. A filter is disposed at least partially in the body cavity, and includes a filter cavity and filter media for filtering the fluid. A valve is associated with the body for allowing the fluid to flow into and out of the vessel. When the fluid flows into the vessel, the fluid flows through the filter cavity and along the first fluid path without flowing through the filter media. When the fluid flows out of the vessel, the fluid flows along the first fluid path, through the filter media and along the second fluid path.

14 Claims, 6 Drawing Sheets

U.S. PATENT DOCUMENTS

| | | |
|---|---|---|
| 4,599,487 A | 7/1986 | Blank et al. |
| 4,611,628 A | 9/1986 | Pasternack |
| 4,643,215 A | 2/1987 | Phlipot et al. |
| 4,655,246 A | 4/1987 | Phlipot et al. |
| 4,718,638 A | 1/1988 | Phlipot et al. |
| 4,723,567 A | 2/1988 | Phlipot et al. |
| 4,785,847 A | 11/1988 | Steer et al. |
| 4,971,957 A | 12/1988 | Ross |
| 4,811,752 A | 3/1989 | Lyons et al. |
| 4,817,658 A | 4/1989 | Lyons |
| 4,820,889 A | 4/1989 | Seghetti |
| 4,858,583 A | 8/1989 | Sonntag |
| 4,887,638 A | 12/1989 | Hellquist et al. |
| 4,971,224 A | 11/1990 | Scremin |
| 5,009,249 A | 4/1991 | Fisher et al. |
| 5,025,758 A | 6/1991 | Djurdjevic |
| 5,026,026 A | 6/1991 | Sever et al. |
| 5,029,730 A | 7/1991 | Kostecki et al. |
| 5,088,622 A | 2/1992 | Valy et al. |
| 5,193,580 A | 3/1993 | Wass et al. |
| 5,197,671 A | 3/1993 | Wass et al. |
| 5,197,710 A | 3/1993 | Wass et al. |
| 5,330,031 A | 7/1994 | Hill et al. |
| 5,341,844 A | 8/1994 | Wass et al. |
| 5,379,761 A | 1/1995 | Schuler |
| 5,452,738 A | 9/1995 | Borland et al. |
| 5,458,151 A | 10/1995 | Wass |
| 5,495,865 A | 3/1996 | Wass et al. |
| 5,507,308 A | 4/1996 | Chambonnet |
| 5,562,117 A | 10/1996 | Borland et al. |
| 5,566,713 A | 10/1996 | Lhomer et al. |
| 5,584,318 A * | 12/1996 | Brandt .................... 210/433.1 |
| 5,611,316 A | 3/1997 | Oshima et al. |
| 5,614,091 A * | 3/1997 | Janik et al. ................. 210/418 |
| 5,644,104 A | 7/1997 | Porter et al. |
| 5,649,561 A * | 7/1997 | Brandt ....................... 123/511 |
| 5,651,477 A | 7/1997 | Takahashi et al. |
| 5,755,254 A | 5/1998 | Carter et al. |
| 5,799,640 A | 9/1998 | Sugimoto et al. |
| 5,829,418 A | 11/1998 | Tamura et al. |
| 5,899,221 A | 5/1999 | Holt et al. |
| 5,989,413 A * | 11/1999 | Jauss et al. .............. 210/416.4 |
| 6,012,485 A | 1/2000 | Connelly et al. |
| 6,029,629 A | 2/2000 | Tipton |
| 6,041,762 A | 3/2000 | Sirosh et al. |
| 6,063,269 A * | 5/2000 | Miller et al. ................. 210/171 |
| 6,155,238 A * | 12/2000 | Briggs et al. ............... 123/510 |
| 6,186,168 B1 * | 2/2001 | Schultz et al. ......... 137/505.11 |
| 6,213,143 B1 * | 4/2001 | Schwegler et al. ...... 210/416.4 |
| 6,321,779 B1 * | 11/2001 | Miller et al. ........... 137/505.25 |

* cited by examiner

FILTER ARRANGEMENT

CROSS-REFERENCE TO RELATED APPLICATIONS

This application is a continuation-in-part of Ser. No. 09/642,747, filed on Aug. 18, 2000, now U.S. Pat. No. 6,321,779, which is a continuation-in-part of Ser. No. 09/314,756, filed May 19, 1999, now U.S. Pat. No. 6,186,168.

BACKGROUND OF THE INVENTION

1. Field of the Invention

The invention relates to a filter arrangement for use with a vessel that is configured to receive fluid, and the arrangement includes a particle filter having filter media that can be bypassed when the vessel is being filled.

2. Background Art

Particle filters are used in fuel systems to remove particles, such as dirt and/or metal particles, from fuel that is supplied to an engine. In one known fuel system, a particle filter is located downstream of a vessel or cylinder containing compressed fuel, such as natural gas, and upstream of a pressure regulator that regulates pressure of the fuel supplied to an engine. The fuel system also includes a cylinder valve mounted on the cylinder for controlling flow of fuel out of the cylinder. The fuel system may also include additional cylinders connected in series, and additional cylinder valves connected to the additional cylinders.

While such a system is effective, it is desirable to provide a simplified system in which multiple components are combined together and are disposed proximate a particular cylinder.

SUMMARY OF THE INVENTION

Under the invention, a filter arrangement is provided for use with a vessel configured to receive fluid. The filter arrangement includes a body engageable with the vessel and having an inlet port, an outlet port, a body cavity, a first fluid path disposed between the inlet port and the body cavity, and a second fluid path disposed between the body cavity and the outlet port. The filter arrangement further comprises an additional inlet port in fluid communication with the body cavity for receiving fluid from a fluid source. For example, the additional inlet port may receive fluid from one or more additional vessels. A filter is disposed at least partially in the body cavity, and the filter defines a filter cavity. The filter further includes filter media for filtering the fluid. Advantageously, the filter may be used to filter fluid from such additional vessels. A valve is associated with the body for allowing the fluid to flow into the vessel and out of the vessel. When the fluid flows into the vessel, the fluid flows through the filter cavity and along the first fluid path without flowing through the filter media. When the fluid flows out of the vessel, the fluid flows along the first fluid path, through the filter media and along the second fluid path.

Advantageously then, the filter arrangement is configured such that the filter media can be bypassed during a vessel filling operation. As a result, the flow of fluid is not restricted by the filter during such a filling operation.

In one embodiment of the invention, the filter arrangement further includes a pressure regulating device disposed in the body for regulating pressure of the fluid. Such a pressure regulating device may also be used to regulate pressure of fluid provided by other fluid sources.

Further under the invention, a system for filtering fluid is provided. The system comprises a vessel for receiving fluid, and a body engaged with the vessel. The body has an inlet port, an outlet port, a body cavity, a first fluid path disposed between the body cavity and the inlet port, and a second fluid path disposed between the body cavity and the outlet port. A filter is disposed at least partially in the body cavity, and the filter defines a filter cavity. The filter further includes filter media for filtering the fluid. A valve is associated with the body for allowing the fluid to flow into the vessel and out of the vessel. When the fluid flows into the vessel, the fluid flows through the filter cavity and along the first fluid path without flowing through the filter media. When the fluid flows out of the vessel, the fluid flows along the first fluid path, through the filter media and along the second fluid path.

These and other objects, features and advantages of the invention are readily apparent from the following detailed description of the best modes for carrying out the invention, when taken in conjunction with the accompanying drawings.

DETAILED DESCRIPTION OF THE PREFERRED EMBODIMENT(S)

Figure 1:
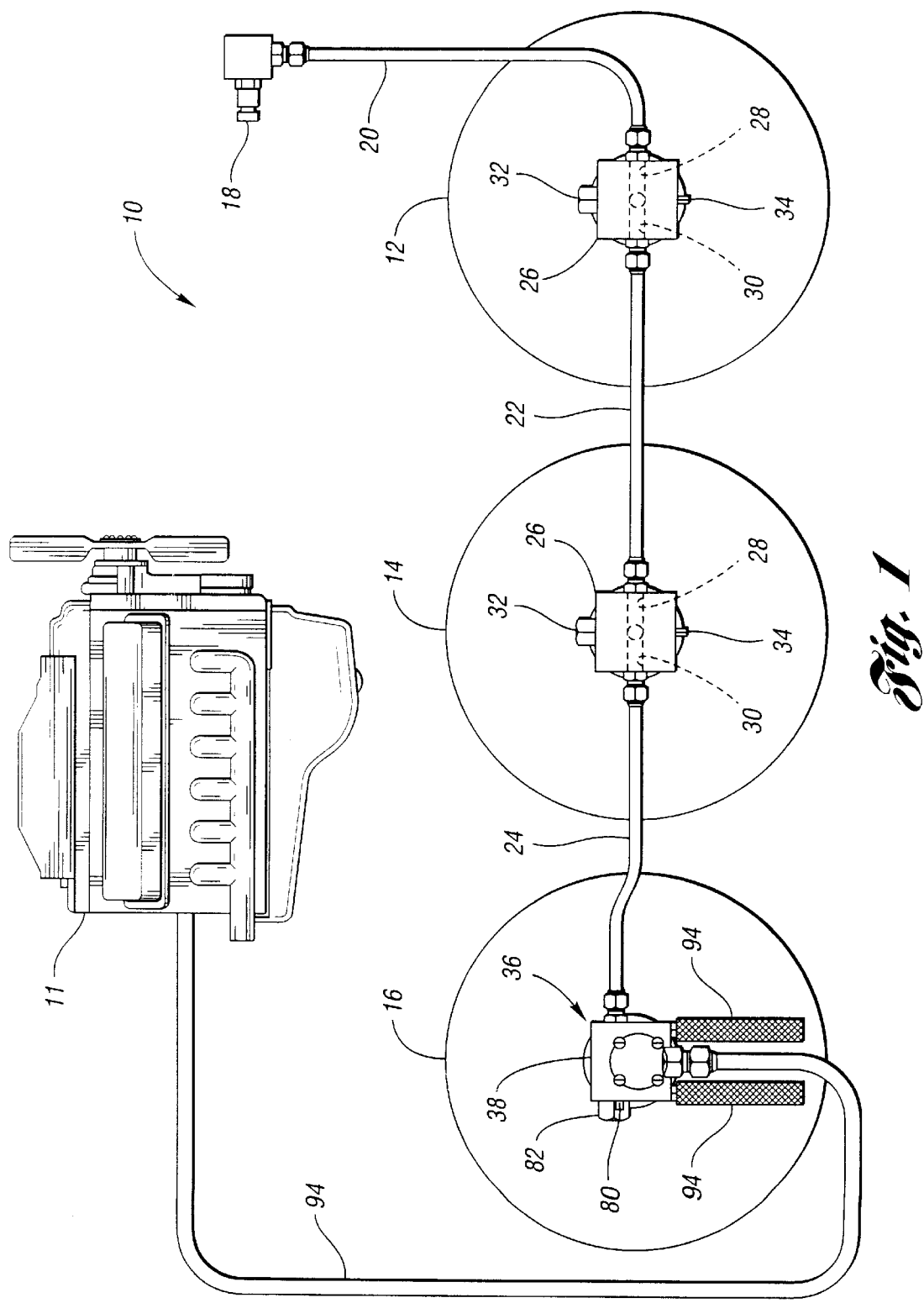
FIG. 1 is an end view of a system according to the invention for supplying filtered fuel to an engine, and the system includes first, second and third cylinders connected together, and a filter arrangement connected to the third cylinder.

FIG. 1 shows a system 10 according to the invention for supplying filtered fluid for a particular application. In a preferred embodiment, the system 10 supplies filtered fuel to an engine 11 of a vehicle or other engine operated equipment. Alternatively, the system 10 may be used to filter any suitable fluid, such as carbon dioxide, oxygen, or other commercial gases.

The system 10 includes one or more vessels, such as tanks or cylinders, that are preferably configured to receive pressurized fuel, such as compressed natural gas, hydrogen, or other fuel. In the embodiment shown in FIG. 1, the system 10 includes first, second and third cylinders 12, 14 and 16, respectively, that are made of any suitable material such as steel, aluminum and/or fiber reinforced plastic. The cylinders 12, 14 and 16 may be filled using a fill receptacle 18, which is connected to the cylinders 12, 14 and 16 with first, second and third high pressure lines 20, 22 and 24, respectively.

The system 10 further includes two cylinder valves 26, with one cylinder valve 26 being connected to the first cylinder 12, and the other cylinder valve 26 being connected to the second cylinder 14. Each cylinder valve 26 includes an inlet port 28, an outlet port 30, a thermally activated pressure relief device 32, a manual valve 34 for isolating a respective cylinder 12 or 14 from corresponding ports 28 and 30, and a supply valve such as a high pressure solenoid-operated valve (not shown) that is preferably disposed inside a respective cylinder 12 or 14. The ports 28 and 30 of each cylinder valve 26 allow fuel to flow straight through each cylinder valve 26, and also allow fuel to flow into and out of a respective cylinder 12 or 14. In order for fuel to flow into or out of a respective cylinder 12 or 14 and through a corresponding port 28 or 30, the corresponding manual valve 34 must be open. Furthermore, when the system 10 is supplying fuel to the engine 11, one or both of the solenoid-operated valves (not shown) may be energized so as to open the solenoid-operated valves and allow fuel to flow out of one or both of the cylinders 12 and 14. During a filling operation, the solenoid-operated valves preferably act as check valves that are forced open by the fuel even if the solenoid-operated valves are de-energized.

Figure 2:
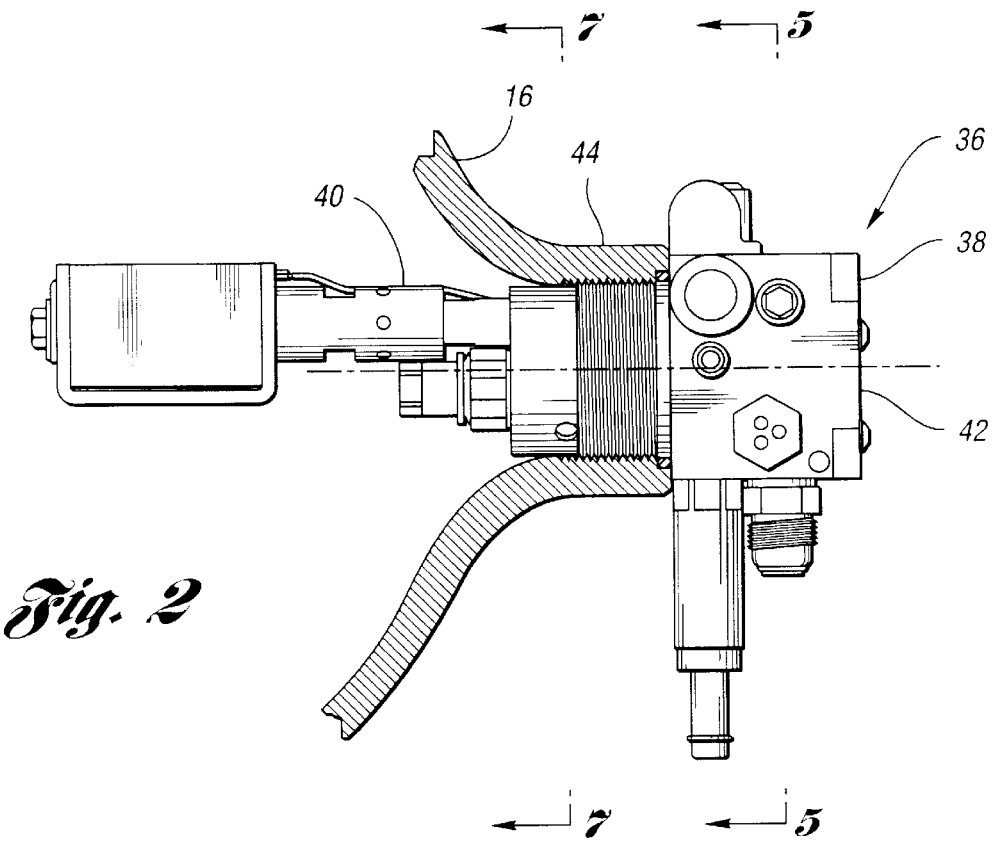
FIG. 2 is a fragmentary side view of the third cylinder and filter arrangement, with the third cylinder shown in section.
Figure 3:
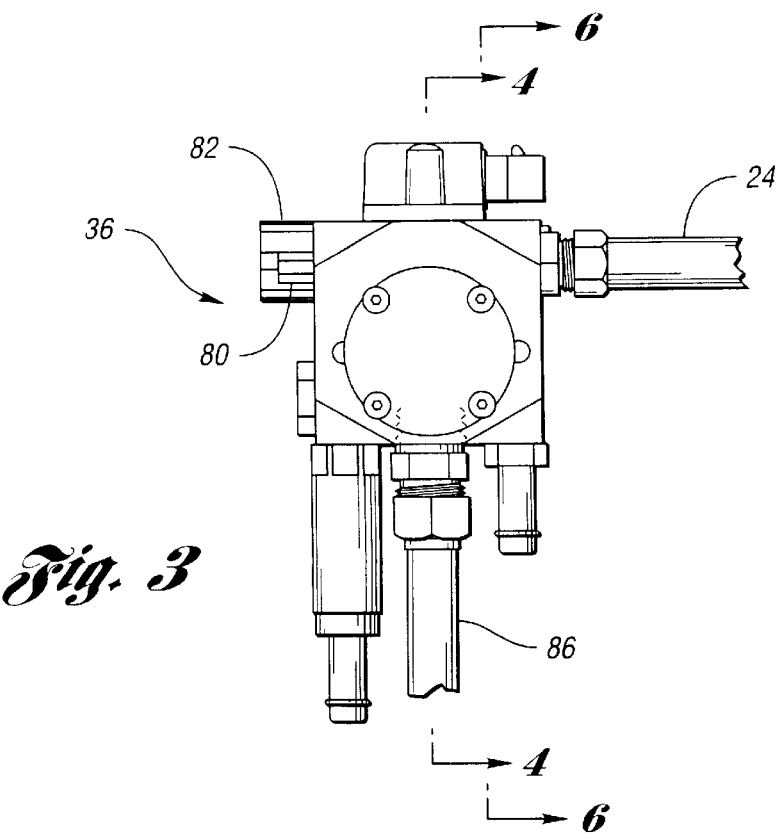
FIG. 3 is an end view of the filter arrangement.

The system 10 also includes a filter arrangement 36 connected to the third cylinder 16. Referring to FIGS. 1 and 2, the filter arrangement 36 includes a pressure regulator 38 and a supply valve 40 connected to the pressure regulator 38. The pressure regulator 38 regulates outlet pressure of the third cylinder 16, as well as the pressure of fuel supplied by the first and second cylinders 12 and 14, respectively, and includes a body 42 threadingly engaged with a neck 44 of the third cylinder 16.

Referring to FIGS. 2–8, the body 42 includes first and second inlet ports 46 and 48, respectively, a body cavity 50, an outlet port 51, a first fluid path 52 extending between the first inlet port 46 and the body cavity 50, and a second fluid path 54 extending between the body cavity 50 and the outlet port 51. These features are most clearly shown in FIG. 8, which is a schematic view of the filter arrangement 36 shown in FIGS. 2 through 7. It should be understood that inlet port 48 may form part of body cavity 50, or inlet port 48 may be separate from body cavity 50.

Figure 4:
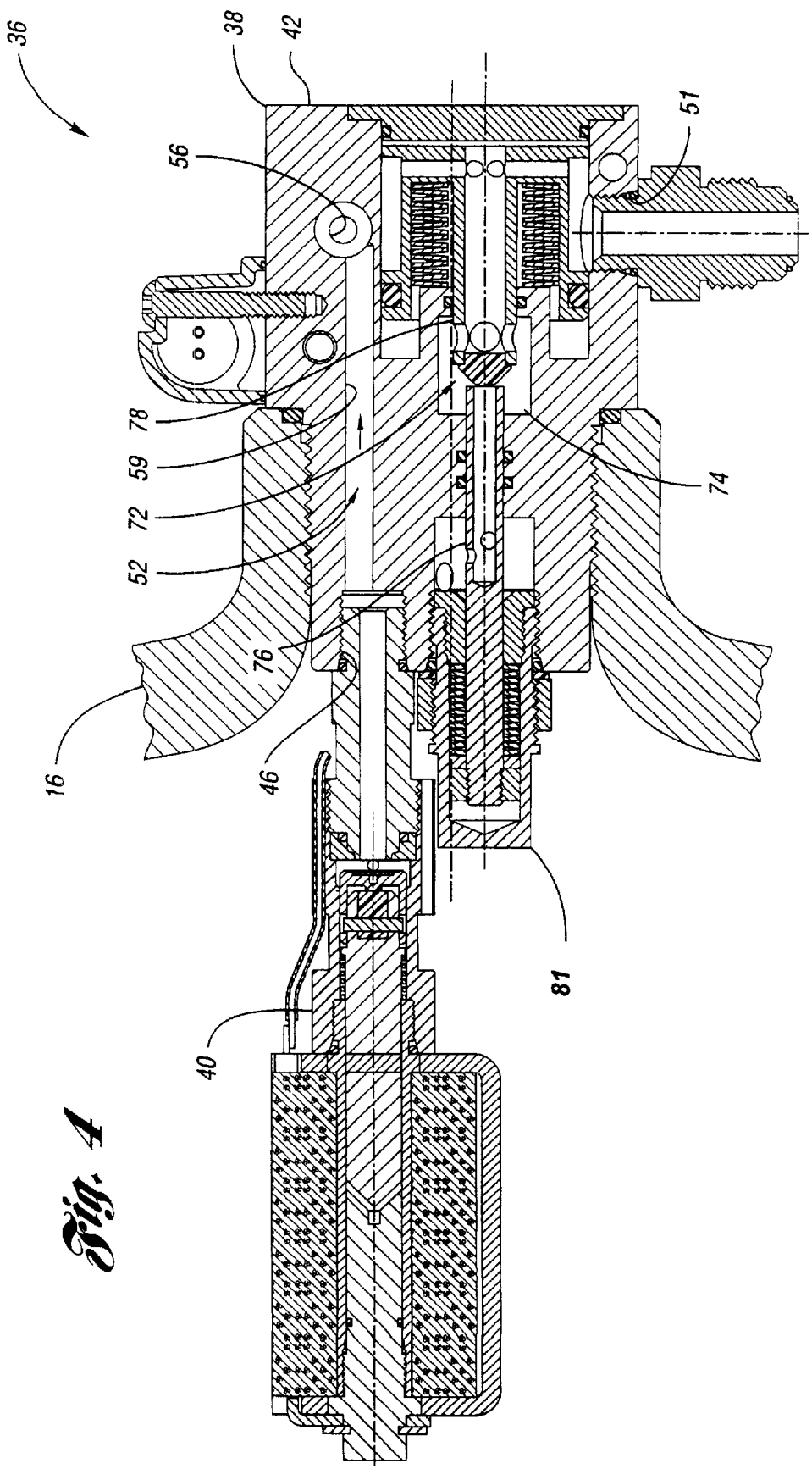
FIG. 4 is a cross-sectional view of the filter arrangement taken along line 4—4 of FIG. 3, wherein the filter arrangement includes a pressure regulator and a supply valve connected to the pressure regulator.
Figure 5:
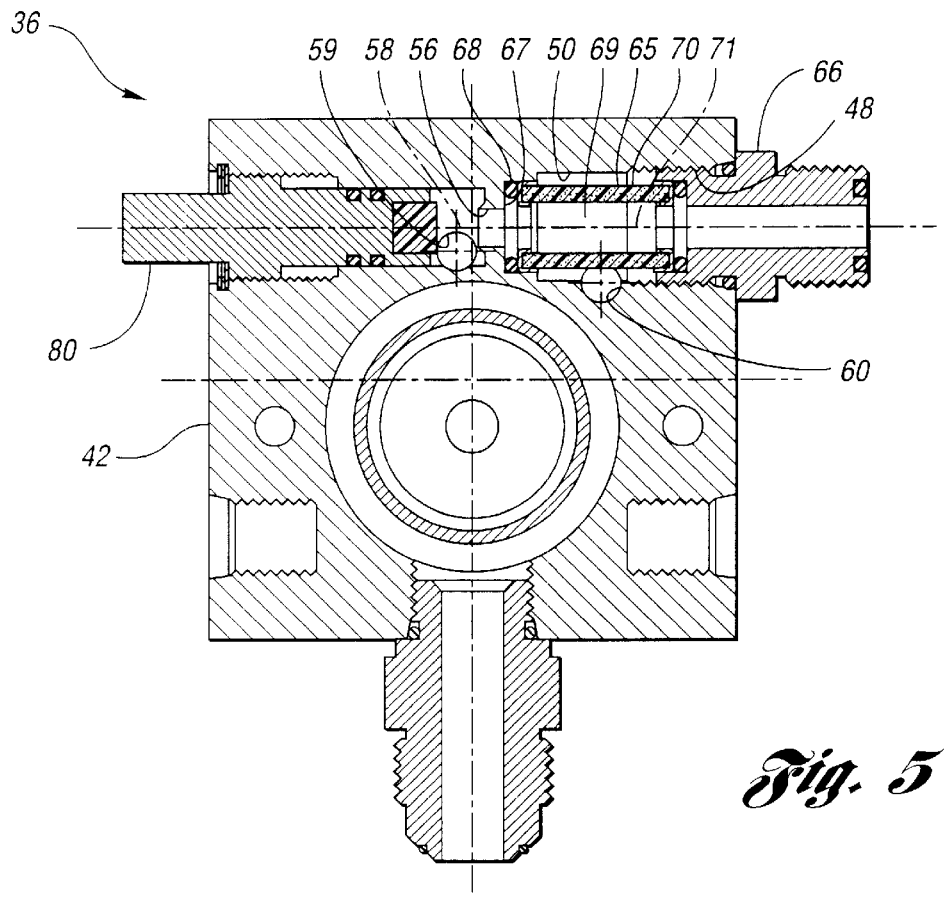
FIG. 5 is a cross-sectional view of the filter arrangement taken along line 5—5 of FIG. 2.
Figure 6:
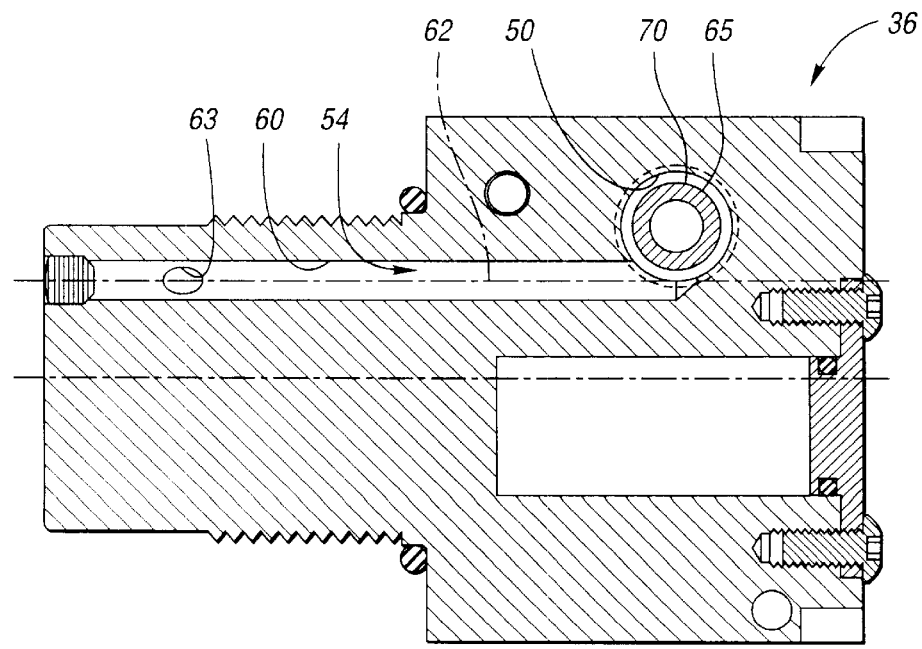
FIG. 6 is a cross-sectional view of the filter arrangement taken along line 6—6 of FIG. 3.
Figure 7:
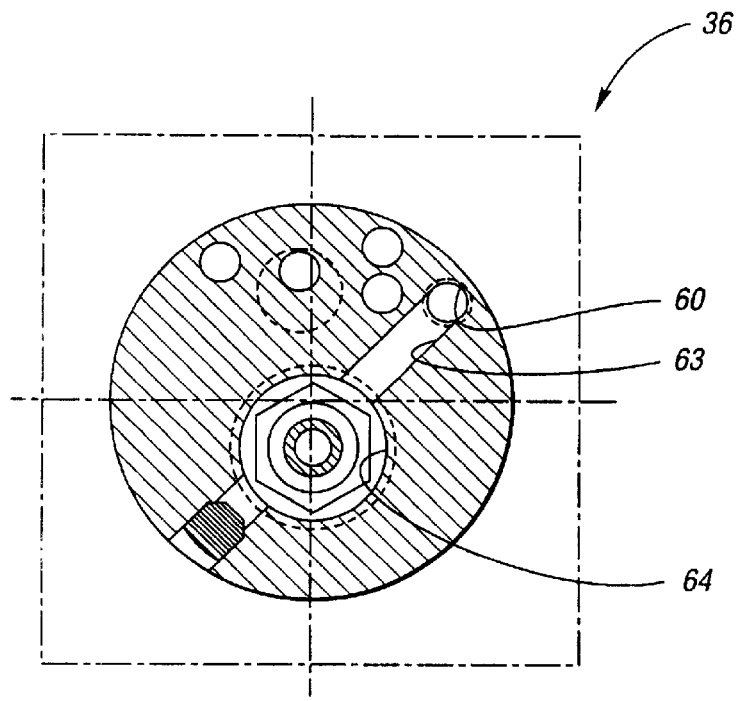
FIG. 7 is a cross-sectional view of the filter arrangement taken along line 7—7 of FIG. 2.
Figure 8:
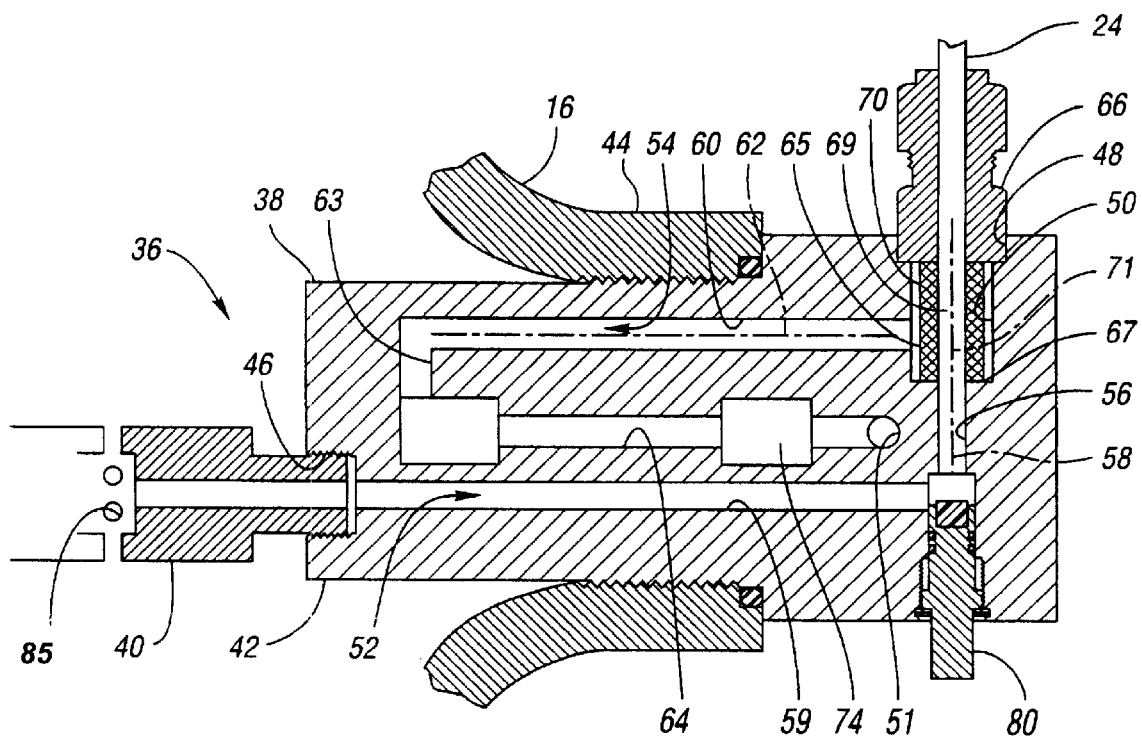
FIG. 8 is a schematic view of the third cylinder and filter arrangement.

Referring to FIGS. 4, 5 and 8, the first fluid path 52 includes a first passage 56 disposed adjacent the body cavity 50 and having a first passage axis 58. The first fluid path 52 may further include additional passages, such as passage 59, disposed between the first inlet 46 and the first passage 56. Alternatively, the first fluid path 52 may have any suitable configuration. Referring to FIGS. 6 through 8, the second fluid path 54 includes a second fluid passage 60 disposed adjacent the body cavity 50 and having a second passage axis 62. The second fluid path 54 may further include additional passages, such as passage 63 and passage 64, disposed between the second fluid passage 60 and the outlet port 51. Alternatively, the second fluid path 54 may have any suitable configuration.

Referring to FIGS. 5, 6 and 8, a particle filter 65 is disposed in the body cavity 50 for removing particles, such as dirt or metal particles, from the fuel. As shown in FIG. 5, filter 65 is preferably held securely in place between inlet fitting 66 and shoulder 67 of body 42. Seals such as O-rings 68 may also be provided to seal ends of the filter 65 against the inlet fitting 66 and the shoulder 67.

Filter 65 defines a filter cavity 69 and includes filter media 70 for filtering the fuel. Filter media 70 may comprise any suitable material such as pleated wire cloth, sintered stainless steel, or sintered brass. The filter 65 further includes a filter axis 71 that is coaxially aligned with the first passage axis 58 and nonparallel to the second passage axis 62.

Returning to FIG. 4, the pressure regulator 38 also includes a pressure regulating device 72 that extends into a pressure regulating chamber 74 of the second fluid path 54. While the pressure regulating device 72 may have any suitable configuration and include any suitable components, such as a single piston, in a preferred embodiment the pressure regulating device 72 includes a compensation piston 76 and a main or sensor piston 78. The compensation piston 76 compensates for varying pressure of fuel provided to the pressure regulating device 72, and the sensor piston 78 cooperates with the compensation piston 76 to regulate outlet pressure. In addition, the pressure regulator 38 preferably includes a pressure adjuster 81 for adjusting the outlet pressure.

Figure 9:
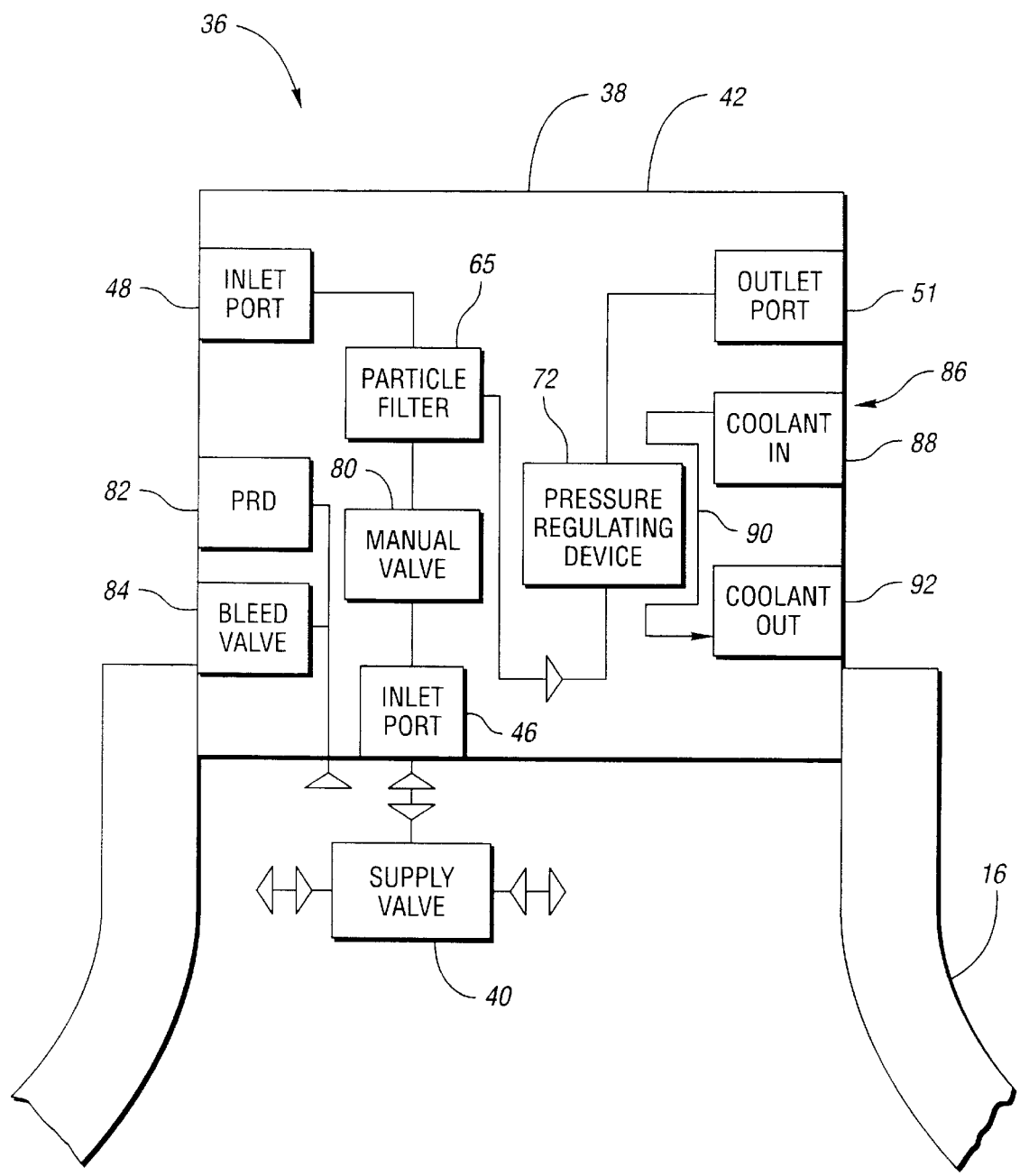
FIG. 9 is a schematic diagram of the third cylinder and filter arrangement.

Referring to FIGS. 1, 5 and 9, the pressure regulator 38 further preferably includes a manual shutoff valve 80 that operates in a similar manner as described above with respect to the manual shutoff valves 34. The pressure regulator 38 may also be provided with a thermally activated pressure relief device 82, a bleed valve 84 that allows the cylinder 16 to be emptied in case the supply valve 40 fails, and a heating fluid circuit 86 for routing heating fluid, such as engine coolant, through the body 42. As shown in FIG. 9, the heating fluid circuit 86 may include, for example, a coolant inlet port 88, a coolant path 90, and a coolant outlet port 92. As shown in FIG. 1, coolant lines 94 may be connected to the pressure regulator 38 for supplying engine coolant to the heating fluid circuit 86.

Additional details regarding the pressure regulator 38 are disclosed in, copending patent application Ser. No. 09/642,747, now U.S. Pat. No. 6,321,779, which is hereby incorporated by reference in its entirety. Alternatively, in lieu of the pressure regulator 38, the filter arrangement 36 may be provided with any suitable body that is engageable with the third cylinder 16, such as a valve body or an end cap. Such a body, however, should include features similar to inlets 46 and 48, body cavity 50, outlet port 51, first fluid path 52 and second fluid path 54.

Referring to FIGS. 4, 8 and 9, the supply valve 40 controls flow of fuel from the third cylinder 16 into the pressure regulator 38. Preferably, the supply valve 40 is an electrically controlled valve, such as a solenoid-operated valve, that is normally closed. In other words, supply valve 40 is preferably closed when not energized, and open when energized. The supply valve 40 operates in a similar manner as the solenoid-operated valves described above with respect to the cylinder valves 26.

With reference to FIGS. 1, 8 and 9, operation of the system 10 will now be described. During a filling operation, fuel may be supplied to fill receptacle 18. As described above, fuel may then enter first and second cylinders 12 and 14, respectively, via first and second high pressure lines 20 and 22, respectively. Next, fuel may flow through third high pressure line 24 and onto second inlet port 48 of third cylinder 16. If manual valve 80 is open, the fuel may then flow through filter cavity 69 and along first fluid path 52 without flowing through filter media 70. Supply valve 40 will also be forced open by the fuel so as to allow the fuel to flow through apertures 85 and into third cylinder 16.

Advantageously, because the fuel does not pass through filter media 70 prior to flowing into third cylinder 16, the flow of fuel is not restricted by the filter 65. Furthermore, the filter media 70 is not adversely affected by such flow, which may be more than 100 times greater than flow during a withdrawal operation. During a withdrawal operation, supply valve 40 may be energized so as to allow fuel to flow through apertures 85 and along first fluid path 52. Next, the fuel will flow through filter media 70 and along second fluid path 54 to pressure regulating chamber 74, where the fuel will be regulated to a desired pressure such as 100 pounds per square inch. The fuel will then continue along second fluid path 54 to outlet port 51. From outlet port 51, the fuel may travel along supply line 94 to the engine 11.

If fuel is also being supplied by one or both of the cylinders 12 and 14, then such fuel will enter pressure regulator 38 at second inlet port 48. This fuel will mix with the fuel from third cylinder 16, pass through filter media 70 and along second fluid path 54. It is to be understood that fuel may be provided from any one of the cylinders 12, 14 and 16, or from more than one of the cylinders 12, 14 and 16.

Advantageously, filter 65 may be used to filter fuel supplied by any of the cylinders 12, 14 and 16. Furthermore, because filter 65 may be disposed inside of pressure regulator 38 or other suitable body, the filter arrangement 36 of the invention is robust.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A filter arrangement for use with a vessel configured to receive and discharge fluid through the same opening, the arrangement comprising:
   a body engageable with the vessel and having a body cavity, a first inlet port in fluid communication with the vessel, a first fluid path disposed between the first inlet port and the body cavity, a second inlet port in fluid communication with the body cavity for receiving fluid from a fluid source, an outlet port, and a second fluid path disposed between the body cavity and the outlet port; and
   a filter, having filter media, positioned in the body cavity so that the second fluid path is connected to the first fluid path through the filter media and so that fluid communication of the first fluid path with the second inlet port through the body cavity is unimpeded by the filter media, wherein when the fluid flows from the fluid source into the vessel, the fluid flows along the first fluid path without flowing through the filter media, and when the fluid flows through the outlet port and out of the vessel, the fluid flows through the filter media.

2. The filter arrangement of claim 1 wherein the first fluid path includes a first passage disposed adjacent the body cavity and having a first passage axis, the second fluid path includes a second passage disposed adjacent the body cavity and having a second passage axis, and the filter has a filter axis that is coaxially aligned with the first passage axis and nonparallel to the second passage axis.

3. The filter arrangement of claim 2 further comprising a supply valve associated with the body and first fluid path for allowing the fluid to flow in and out of the vessel along the first fluid path.

4. The filter arrangement of claim 3 wherein the valve is an electrically controlled valve supported by the body.

5. The filter arrangement of claim 1 further comprising a pressure regulating device disposed in the body for regulating pressure of the fluid flowing along the second fluid path.

6. The filter arrangement of claim 1 wherein the filter further defines a filter cavity, separated from the body cavity by the filter media, wherein when the fluid flows into the vessel from the second inlet port, the fluid flows through the filter cavity to the first fluid path and wherein when the fluid flows out of the vessel, the fluid flows through the filter media.

7. The filter arrangement of claim 1 further comprising at least one additional vessel in fluid communication with the second inlet port, wherein the filter media will also filter fluid from said additional vessel.

8. A system comprising:
   a vessel for receiving and discharging fluid through the same opening;
   a body engageable with the vessel and having a body cavity, a first inlet port in fluid communication with the vessel, a first fluid path disposed between the first inlet port and the body cavity, a second inlet port in fluid communication with the body cavity for receiving fluid from a fluid source, an outlet port, and a second fluid path disposed between the body cavity and the outlet port; and
   a filter, having filter media, positioned in the body cavity so that the second fluid path is connected to the first fluid path through the filter media and so that fluid communication of the first fluid path with the second inlet port through the body cavity is unimpeded by the filter media, wherein when the fluid flows from the fluid source into the vessel, the fluid flows along the first fluid path without flowing through the filter media, and when the fluid flows through the outlet port and out of the vessel, the fluid flows through the filter media.

9. The system of claim 8 further comprising at least one additional vessel in fluid communication with the second inlet port.

10. The system of claim 8 wherein the first fluid path includes a first passage disposed adjacent the body cavity and having a first passage axis, the second fluid path includes a second passage disposed adjacent the body cavity and having a second passage axis, and the filter has a filter axis that is coaxially aligned with the first passage axis and nonparallel to the second passage axis.

11. The filter arrangement of claim 10 further comprising a supply valve associated with the body and first fluid path for allowing the fluid to flow in and out of the vessel along the first fluid path.

12. The system of claim 11 wherein the valve is an electrically controlled valve supported by the body.

13. The system of claim 8 further comprising a pressure regulating device disposed in the body for regulating pressure of the fluid flowing along the second fluid path.

14. The system of claim 8 wherein the filter further defines a filter cavity, separated from the body cavity by the filter media, wherein when the fluid flows into the vessel from the second inlet port, the fluid flows through the filter cavity to the first fluid path and wherein when the fluid flows out of the vessel, the fluid flows through the filter media.

* * * * *